Jan. 1, 1935.  H. C. GRANT, JR  1,986,055
AIR REGULATING MEANS FOR LIQUID FUEL FURNACES
Filed Nov. 3, 1932
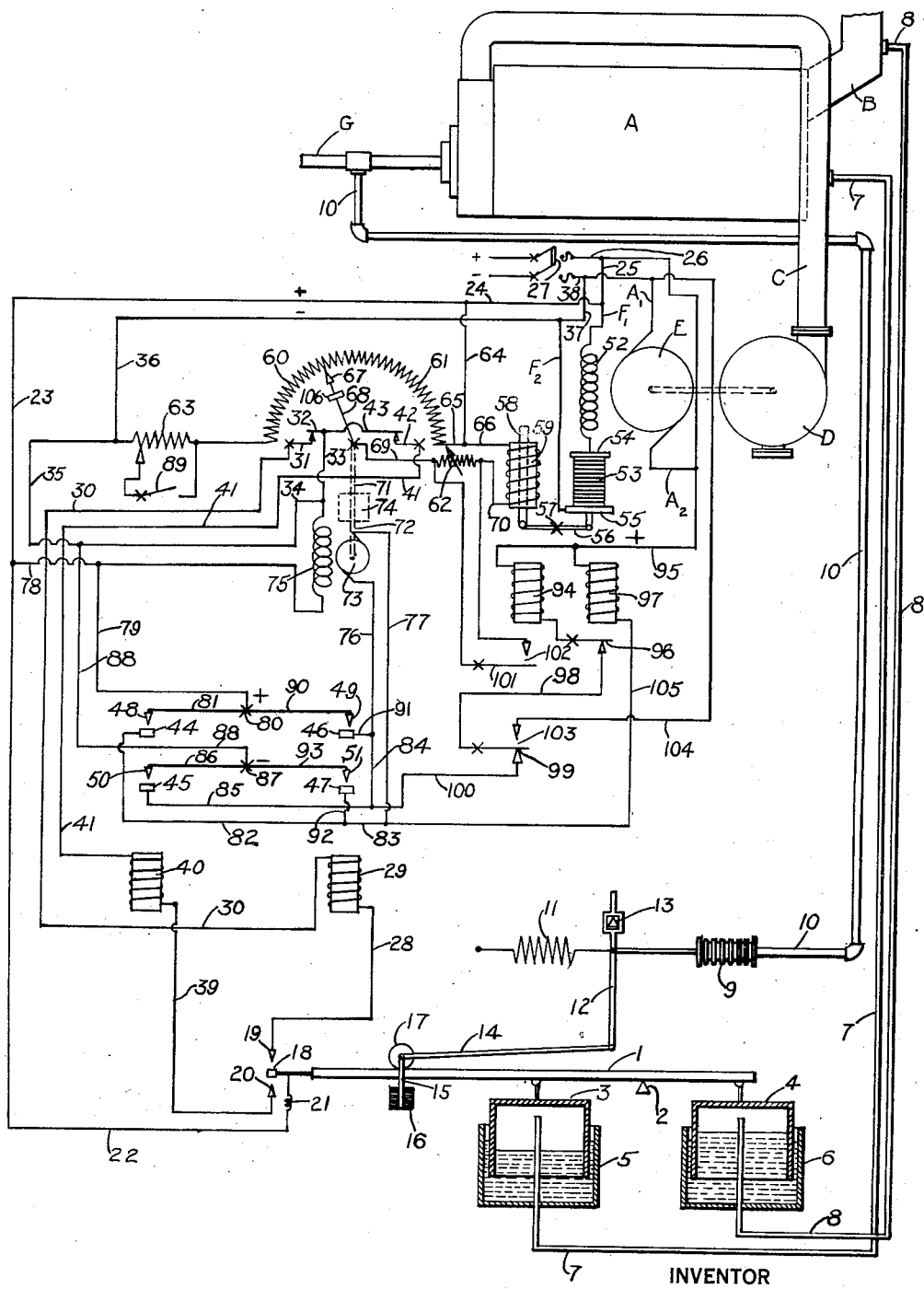
INVENTOR
HARRY CAMPBELL GRANT, JR.
BY
J. William Carson
ATTORNEY

UNITED STATES PATENT OFFICE 1,986,055

AIR REGULATING MEANS FOR LIQUID FUEL FURNACES

Harry Campbell Grant, Jr., New York, N. Y., assignor to Walter Kidde & Company, Inc., New York, N. Y., a corporation of New York Application November 3, 1932, Serial No. 641,027

23 Claims. (Cl. 236—15)

This invention relates to means for varying the volume of air for combustion purposes supplied to liquid-fuel furnaces and the like through the medium of automatic control means actuated by the pressure of the fuel, so that proportionate quantities of fuel and air are introduced into a furnace under all variations of heat production found desirable.

More specifically, the present invention constitutes a modification of the inventions shown and described in my copending applications for Letters Patent of the United States, Serial Nos. 620,430 and 620,429, both filed July 1, 1932, being in effect an all-electrical equivalent of the mechanical control shown and described in my aforesaid applications.

As distinguished from my prior applications, wherein a balancing mechanism controlled by the variable pressures of fuel and air is employed to control the supply of steam to the air delivery control means of a furnace, whereby to maintain a proper balance between the quantities of fuel and air delivered to the furnace, and in which electrically operated means are employed for translating the controlling effect of the balancing mechanism into control of the supply of steam to the air delivery control means, the present invention contemplates the use of electrically actuated air delivery control means together with all-electrically operated means for translating the controlling effect of the balancing mechanism into control of the air delivery control means.

It is accordingly an object of the present invention to provide a regulating mechanism for maintaining a balanced condition between the quantities of fuel and air delivered to a furnace, said regulating mechanism comprising all-electrically operated means for translating the controlling effect of a balancing mechanism into operations required to produce the desired balanced condition between the quantities of fuel and air.

It is another object of the invention to provide an electrically actuated air delivery control means which is not only automatically operated to effect desired increases or decreases in the quantity of air delivered, but which is provided with means for preventing any tendency of the air delivery control means to be operated beyond desired points of limiting maximum and minimum quantities of air delivered.

A further object is to provide electrically actuated air delivery control means which can be actuated quickly or slowly to take care of sudden changes in the demand for air under widely varying operating conditions.

Another object is to provide electrically operated means to anticipate requisite increases or decreases in the quantity of air to be delivered by the air delivery control means of a furnace.

These and other objects of the invention will be apparent as the same is described more fully in connection with the accompanying drawing, in which the single figure represents an apparatus embodying my invention.

Referring to the drawing, A is a furnace having an induced draft stack B and an air delivery duct C, the delivery of air to the latter being effected by a blower D controlled by an electrically actuated prime mover E. The reference character G represents the fuel supply to the furnace A.

At 1 is shown a balance arm having a fulcrum at 2 and having suspended therefrom two air containers 3 and 4. These air containers are arranged to rise and fall within tanks 5 and 6 containing an air-sealing liquid, such as water. The interior of the air container 3 is connected by means of a pipe line 7 with the forced draft duct C, while the interior of the air container 4 is connected by means of a pipe line 8 with the induced draft stack B. At 9 is shown an expansible bellows-like member which is connected by a pipe line 10 with the fuel supply G and which is adapted to expand and contract upon variations in the pressure of the fuel, the movements of the bellows-like member being transmitted, against the compressive force of a spring 11, to an arm 12, pivoted at 13, and connected by a link 14 with a carriage 15 supporting a number of weights 16 and adapted to be moved along the balance arm 1 with the aid of a roller 17.

The arrangement as just described, enables a balanced condition to be maintained by the balance arm between the variable pressures of the fuel and air delivered to the furnace and, while this arrangement in itself forms no part of the present invention, it is the purpose of the present invention to translate the controlling effect of the balance arm 1 into the operations necessary to actuate the electrically operated prime mover E so as to effect the desired balanced condition between the quantities of fuel and air delivered to the furnace.

The reference numeral 18 represents a contact supported on the balance arm 1 and adapted to rise and fall with the balance arm between contacts 19 and 20 arranged to define upper and lower limiting positions of the balance arm. The contact 18 is electrically connected as by a flexible connection 21, wires 22, 23, 24, 25 and 26, and one side of the double pole switch 27 to the positive side of a source of electrical energy. The upper contact 19 is connected by wire 28 with the coil of an electromagnet 29, which in turn is connected with the negative side of the source of electrical energy through wire 30, contact 31, conducting piece 32, wires 33, 34, 35, 36, 37 and 38, and the other side of the double pole switch 27. The lower contact 20 is similarly connected to the negative side of the source of electrical energy by wire 39, the coil of an electro-magnet 40, wire 41, contact 42, conducting piece 43, wires 33, 34, 35, 36, 37 and 38, and one side of the double pole switch 27.

In practice, the electro-magnets 40 and 29 are arranged on a single support and control a single armature pivoted intermediate of the electro-magnets and extending over the cores of both electro-magnets. For the purpose of the present description it will be sufficient to note that the energization of the electro-magnet 40 effects the making of contact at 44 and 45, while the energization of the electro-magnet 29 effects the making of contact at 46 and 47, the movable contact elements 48, 49, 50 and 51 being mounted on but electrically insulated from the armature. It will of course be noted that the movable contacts 48 and 49 are electrically connected while the movable contacts 50 and 51 are similarly electrically connected.

Before proceeding with the detailed description of the manner of control of the electrically operated prime mover or motor E by the movement of the balance arm 1, it should be noted that the armature of the motor is directly connected to the poles of the source of electrical energy through the armature leads $A_1$ and $A_2$, while the field 52 is similarly connected to the poles of the source of electrical energy by means of the field leads $F_1$ and $F_2$, but in series with a variable resistance which has been diagrammatically illustrated at 53 as a carbon pile resistance having a fixed end conductor 54 and a movable end conductor 55, the movement of the latter being controlled by a lever 56 pivoted at 57 and connected to the core 58 of a solenoid 59. For the purpose of the present description it is to be understood that an increase in the voltage applied to the solenoid 59 is to decrease the resistance of the variable resistance 53 and therefore increase the excitation of the field 52, resulting in an increase in the speed of the electrical motor E with a corresponding increase in the quantity of air delivered to the furnace by the blower D. Of course, a decrease in the voltage applied to the solenoid 59 will have the reverse effect.

The voltage applied to the solenoid 59 is controlled primarily by the variable resistance 60—61, and secondarily by the variable resistances 62 and 63. The variable resistances 60—61 and 63 are normally in series with each other and are directly connected to the poles of the source of electrical energy so as to be subject to the full line voltage thereof, the manner of connection through the wires 36 and 64 being readily seen.

The portion 61 of the variable resistance 60—61 and the resistance 62 are normally in parallel with each other and resistance 62 is connected in series with the winding of the solenoid 59, the connection to one end of the solenoid winding being from the resistance 61 through the wires 65 and 66, and the connection to the other end of the solenoid winding being from the resistance 61 through the movable contact 67, the switch arm 68, the wire 69, the variable resistance 62, and the wire 70.

From the foregoing explanation it should be apparent that the degree of energization of the solenoid 59 depends primarily upon the amount of the resistance 61 in parallel with the solenoid winding, but before proceeding with the description of the manner in which the value of the resistance 61 is varied, it should be noted that the values of the portions 60 and 61 of the resistance 60—61 vary depending upon the position of the movable contact 67, that the sum of the values of the resistances 60 and 61 is constant and equals the value of the resistance 60—61, and that the amount of the resistance 61 in series at any time with the resistance 62 primarily determines the value of the voltage applied to the solenoid 59, this voltage being secondarily determined by the values of the resistances 62 and 63, which are not only variable but which may be short-circuited in a manner and for reasons which will be pointed out hereinafter.

The movable contact 67 and its switch arm 68 are shown connected by means of shafts 71 and 72 to an electrical motor 73, through a suitable speed reducer 74, so that rotation of the motor in one direction will cause the movable contact 67 to move along the resistance 60—61 in one direction, and so that reversal of the motor will cause the contact 67 to move in the opposite direction. The field 75 of the motor 73 is connected directly to the source of electrical energy, as can be readily seen. The armature of the motor 73 is reversible through the connection of the armature leads 76 and 77, which can be varied in a manner shortly to be described.

Let it now be assumed that the balance arm is in its balanced position, denoting a desired balanced condition between the quantities of fuel and air supplied to the furnace, with the contact 18 floating midway between the contacts 19 and 20. Let it then be assumed that a change in the pressure of the fuel supplied to the furnace occurs to such an extent as to move the balance arm from its balanced position and cause the contact 18 of the balance arm to make contact at 19 or 20. Further assuming that the pressure of the fuel has increased, the position of the weights 16 will be shifted toward the left along the balance arm, thereby causing contact to be made at 20, whereupon connection is established from the positive side of the source of electrical energy, through one side of the double pole switch 27, wires 26, 25, 24, 23 and 22, connection 21, contact 18—20, wire 39, electro-magnet 40, wire 41, contact 42, conducting piece 43, wires 33, 34, 35, 36, 37 and 38, and the other side of the double pole switch 27 to the negative side of the source of electrical energy. The electro-magnet 40 is consequently energized and attracts its end of the single armature, closing the contacts 44—48 and 45—50. Connection is therefore established from the positive side of the supply, through wires 26, 25, 24, 23, 78 and 79, junction 80, connector 81, contact 48—44, wire 82, wire 83, armature leads 77 and 76 of the motor 73, wire 84, wire 85, contact 45—50, connector 86, junction 87, and wires 88, 35, 36, 37 and 38 to the negative side of the supply, thus causing the motor 73 to be operated and to rotate the switch arm 68 and the movable contact 67 over the resistance 60—61. Under the assumptions herein-above made the apparatus must be arranged to rotate the switch arm 68 in a counter-clockwise direction so as to increase the value of the resistance 61, which as already explained, primarily controls the voltage applied to the winding of the solenoid 59. This increase in the value of the resistance 61 results in an increase in the proportion of the line voltage applied to the solenoid winding, with the result that the solenoid acts to decrease the value of the variable resistance 53. This in turn causes an increase in the excitation of the field 52 of the motor E, which then speeds up the motion of the blower D until sufficient pressure is built up in the air delivery duct C to cause the pressure transmitted through the pipe line 7 to raise the air container 3 and the balance arm 1 to the normal balanced position, whereupon contact 18—20 is broken, the electro-magnet 40 is deenergized, and the energizing circuit of the armature of the motor 73 is interrupted, resulting in the stopping of the motor and in the fixation of the value of the resistance 61 at a value to maintain the desired balanced condition between the quantities of fuel and air delivered to the furnace.

With the arrangement as just described, when some condition arises making necessary a readjustment of the forced draft, the value of the resistance 61 must be changed a certain amount to reestablish a proper forced draft. In view of the fact that the adjustment to be made is rather fine, the act of changing the value of the resistance 61 is necessarily slow, and in order to reduce the time necessary for the value of the resistance to change the required amount, so as to more closely approach the desired continuous balanced condition between the quantities of fuel and air delivered, I provide in series with the resistance 61 the already-mentioned resistance 62 which, when it is necessary to increase the forced draft, is short-circuited, thus subjecting the solenoid 59 to the full voltage across the resistance 61 and effecting a more rapid acceleration of the blower D, the value of the resistance 61 continuing to be changed slowly to obtain a close adjustment on the forced draft. Conversely, when it is necessary to decrease the forced draft, the short-circuit of the resistance 62 is removed, so as to produce a sudden drop in the voltage applied to the solenoid and reduce the speed of the blower more quickly, the varying resistance 61 giving the final close adjustment.

The manner in which the short-circuiting of the resistance 62 is effected and removed will be described in full hereinafter.

With the arrangement as just described, the rate at which the value of resistance 61 changes to readjust the forced draft following some cause requiring such an adjustment is sufficiently rapid for all conditions except in some cases when a great number of fires is suddenly cut in, in which case the opening of many dampers suddenly will cause the forced draft to drop and may allow smoking while the blower is speeding up to bring the forced draft back to normal. As this is a usual occurrence in marine maneuvering, and when it is known that fires are to be cut in and out rapidly, the switch 89 should be closed, so as to short-circuit the speed-controlling resistance 63, it being understood that short-circuiting of the resistance 63 permits the full line voltage to be applied across the resistance 60—61, thus increasing the value of the voltage applied to the winding of the solenoid 59 by the resistance 61. This increase in the voltage applied to the solenoid 59 will cause the motor E and the blower D to be operated at a speed considerably greater than normal and usually at such a high rate that the forced draft will become excessive before the regulating mechanism can fix the value of the resistance 61 at a value to maintain the desired balanced condition. The value of the resistance 61 will be immediately decreased, however, and slowly bring the draft down to normal, thus preventing smoking while maneuvering. In order to prevent this excessive draft when conditions are fairly constant, as at sea, the switch 89 should normally be left open.

The method of operation of the apparatus for reestablishing the balanced condition between the quantities of fuel and air upon an increase in the pressure of the fuel having been described, let it now be assumed that the pressure of the fuel decreases with consequent movement of the weights 16 toward the right along the balance arm 1, thereby causing contact to be made at 19, whereupon connection is established from the positive side of the source of electrical energy, through one side of the double pole switch 27, through wires 26, 25, 24, 23 and 22, connection 21, contact 18—19, wire 28, electromagnet 29, wire 30, contact 31, conducting piece 32, wires 33, 34, 35, 36, 37 and 38, and the other side of the double pole switch 27 to the negative side of the source of electrical energy. The electro-magnet 29 is consequently energized and attracts its end of the single armature, closing the contacts 46—49 and 47—51. Connection is therefore established from the positive side of the supply through wires 26, 25, 24, 23, 78 and 79, junction 80, connector 90, contact 49—46, wire 91, the armature leads 76 and 77 of the motor 73, wire 83, wire 92, contact 47—51, connector 93, junction 87, and wires 88, 35, 36, 37 and 38 to the negative side of the supply, thus causing the motor 73 to be operated in the opposite direction to that previously described and to rotate the switch arm 68 and the movable contact 67 over the resistance 60—61. Under the assumptions herein-above made the apparatus must be arranged to rotate the switch arm 68 in a clockwise direction so as to decrease the value of the resistance 61, causing the motor E to slow down the motion of the blower D until the pressure in the air delivery duct C is reduced sufficiently to cause the pressure transmitted through the pipe line 7 to permit the lowering of the air container 3 and the balance arm 1 to the normal balanced position, whereupon the contact 18—19 is broken, the electro-magnet 29 is deenergized, and the energizing circuit of the armature of the motor 73 is interrupted, resulting in the stopping of the motor and in the fixation of the value of the resistance 61 at a value to maintain the desired balanced condition between the quantities of fuel and air delivered to the furnace.

The manner in which the short-circuiting of the resistance 62 is effected and removed will now be described in detail. In this connection it might be well to remember that it has already been pointed out that the portion 61 of the variable resistance 60—61 and the resistance 62 are normally in parallel with each other and that the resistance 62 is connected in series with the winding of the solenoid 59. From the description already given it will be apparent that a required increase in the forced draft is effected by increasing the portion 61 of the variable resistance 60—61 in parallel with the winding of the solenoid 59, thus increasing the proportion of the full line voltage applied to the solenoid winding. It has also been described how a required increase in the forced draft can be hastened by short-circuiting the resistance 62, so as to apply the voltage across the portion 61 directly to the solenoid winding. It has further been described how closing of the contact 18—20, as upon an increase in the pressure of the fuel requiring an increase in forced draft, will energize the electro-magnet 40, causing the contacts 48—44 and 50—45 to be closed and resulting in an increase in the forced draft. It should now be noted that when such an increase in the forced draft is required and results in the energization of the electro-magnet 40, the electro-magnet 94 is energized by reason of its connection from the positive line at 95, through the contact 96 of the electro-magnet 97, wire 98, contact 99, wire 100, wire 85, contact 45—50, and connector 86 to the negative line, as indicated at the junction 87. The electro-magnet 94 will therefore attract its armature 101, closing contact at 102, thus short-circuiting the resistance 62, as desired, thus speeding up the desired change, in this case toward an increased forced draft. At the same time the electro-magnet 94 will open the contact at 99 and close the contact at 103, thus establishing a holding circuit for the electro-magnet 94 from the positive line at 95, through contact 96, wire 98, contact 103, and wire 104 to the negative line. Electro-magnet 94 will therefore remain energized not only until the desired balanced condition has been effected, but until such time as a decrease in the forced draft is required. At this time contact 18—19 will close, energizing the electro-magnet 29, thus closing the contacts 49—46 and 51—47 and resulting in a decrease of the forced draft. At this time the electro-magnet 97 will be energized by reason of its connection from the positive line 95 through wire 105, wire 83, wire 92, contact 47—51, and connector 93 to the negative line, as indicated at the junction 87. Energization of the electro-magnet 97 breaks the contact 96 in the holding circuit of the electro-magnet 94, causing it to release its armature 101 and thus to open the contact 102. This results in removal of the short-circuit of the resistance 62, as desired, thus again speeding up the desired change, in this case toward a decreased forced draft.

The means for preventing the switch arm 68 from passing beyond desired maximum and minimum limiting values of the resistance 60—61 will now be described. In this connection it has already been described how the movable contact 67 and its switch arm 68 are caused to rotate in either one direction or the other by the electrical motor 73, and it has also been described how the operation of the motor 73 is effected through energization either of the electro-magnet 40 or the electro-magnet 29. It should now be noted that contact 42 is in the energizing circuit of the electro-magnet 40 and that contact 31 is in the energizing circuit of the electro-magnet 29. It should further be noted that the switch arm 68 is provided with a projection 106, which engages the contacts 31 and 42 at the desired limiting positions of the switch arm. When the projection 106 engages the contact 31, it opens the contact and thus breaks the energizing circuit of the electro-magnet 29, stopping both the operation of the electrical motor 73 and the rotation of the switch arm 68. When the projection engages the contact 42, it opens the contact and thus breaks the energizing circuit of the electro-magnet 40, stopping both the operation of the electrical motor 73 and the rotation of the switch arm 68.

From the foregoing description, it will be seen that I have invented an all-electrical equivalent of the mechanical control shown and described in my copending applications hereinabove referred to. While, however, the invention has been described with specific reference to the accompanying drawing, it will be apparent that various modifications can be effected within the spirit of the invention, and that the invention is not to be limited, save as defined in the appended claims.

I claim:

1. In a regulating mechanism for maintaining a balanced condition between the quantities of fuel and air delivered to a furnace and embodying a beam balanced about a fulcrum by the variable pressures of the fuel and the air, said beam exerting a controlling effect on the pressure of the air delivered to a furnace by relatively small movements of the beam on either side of its balanced position and between limiting positions, the combination of air delivery means for delivering air to a furnace, an electrically operated prime mover for actuating the air delivery means, a variable resistance connected to control the speed of operation of the prime mover, electrically operated means for effecting increases and decreases in the value of said resistance for effecting changes in the speed of operation of the prime mover, an electrical circuit for controlling the last named means to cause it to effect an increase in the value of said resistance, a second electrical circuit for controlling said last named means to cause it to effect a decrease in the value of said resistance, two electrical contacts arranged to define upper and lower limiting positions of the beam, each contact being electrically connected with a different one of the two electrical circuits, and a contact on the beam arranged to float normally between the first mentioned contacts and adapted to effect energization of either one or the other of the two electrical circuits upon contacting with either one or the other of the first mentioned contacts, depending upon the direction of unbalance of the beam, so as to reestablish the balance of the beam and of the quantities of fuel and air delivered to the furnace.

2. In a regulating mechanism for maintaining a balanced condition between the quantities of fuel and air delivered to a furnace and embodying a beam balanced about a fulcrum by the variable pressures of the fuel and the air, said beam exerting a controlling effect on the pressure of the air delivered to a furnace by relatively small movements of the beam on either side of its balanced position and between limiting positions, the combination of air delivery means for delivering air to a furnace, an electrically operated prime mover for actuating the air delivery means, a variable resistance connected to control the speed of operation of the prime mover, electro-magnetically controlled means adapted to effect increases and decreases in the value of said resistance in accordance with changes in the energization thereof, a second resistance, means to connect a variable portion of said second resistance to said electromagnetically controlled means to control the degree of energization of the electro-magnetically controlled means, electrically operated means for varying the value of said variable portion of the second resistance, an electrical circuit for controlling the last named means to cause it to effect an increase in the value of said variable portion of the second resistance, a second electrical circuit for controlling said last named means to cause it to effect a decrease in the value of said variable portion of the second resistance, two electrical contacts arranged to define upper and lower limiting positions of the beam, each contact being electrically connected with a different one of the two electrical circuits, and a contact on the beam arranged to float normally between the first mentioned contacts and adapted to effect energization of either one or the other of the two electrical circuits upon contacting with either one or the other of the first mentioned contacts, depending upon the direction of unbalance of the beam, so as to reestablish the balance of the beam and of the quantities of fuel and air delivered to the furnace.

3. In a regulating mechanism for maintaining a balanced condition between the quantities of fuel and air delivered to a furnace and embodying a beam balanced about a fulcrum by the variable pressures of the fuel and the air, said beam exerting a controlling effect on the pressure of the air delivered to a furnace by relatively small movements of the beam on either side of its balanced position and between limiting positions, the combination of air delivery means for delivering air to a furnace, an electrically operated prime mover for actuating the air delivery means, a variable resistance connected to control the speed of operation of the prime mover, electro-magnetically controlled means adapted to effect increases and decreases in the value of said resistance in accordance with changes in the energization thereof, a second resistance, means to connect a variable portion of said second resistance to said electromagnetically controlled means to control the degree of energization of the electro-magnetically controlled means, a third resistance in series with said second resistance, means to short-circuit said third resistance at will, electrically operated means for varying the value of said variable portion of the second resistance, an electrical circuit for controlling the last named means to cause it to effect an increase in the value of said variable portion of the second resistance, a second electrical circuit for controlling said last named means to cause it to effect a decrease in the value of said variable portion of the second resistance, two electrical contacts arranged to define upper and lower limiting positions of the beam, each contact being electrically connected with a different one of the two electrical circuits, and a contact on the beam arranged to float normally between the first mentioned contacts and adapted to effect energization of either one or the other of the two electrical circuits upon contacting with either one or the other of the first mentioned contacts, depending upon the direction of unbalance of the beam, so as to reestablish the balance of the beam and of the quantities of fuel and air delivered to the furnace.

4. In a regulating mechanism for maintaining a balanced condition between the quantities of fuel and air delivered to a furnace and embodying a beam balanced about a fulcrum by the variable pressures of the fuel and the air, said beam exerting a controlling effect on the pressure of the air delivered to a furnace by relatively small movements of the beam on either side of its balanced position and between limiting positions, the combination of air delivery means for delivering air to a furnace, an electrically operated prime mover for actuating the air delivery means, a variable resistance connected to control the speed of operation of the prime mover, electro-magnetically controlled means adapted to effect increases and decreases in the value of said resistance in accordance with changes in the energization thereof, a second resistance, means to connect a variable portion of said second resistance to said electromagnetically controlled means to control the degree of energization of the electro-magnetically controlled means, a third resistance in series with said second resistance, means to short-circuit said third resistance at will, a fourth resistance in parallel with the variable portion of said second resistance, means to short-circuit said fourth resistance, electrically operated means for varying the value of said variable portion of the second resistance, an electrical circuit for controlling the last named means to cause it to effect an increase in the value of said variable portion of the second resistance, a second electrical circuit for controlling said last named means to cause it to effect a decrease in the value of said variable portion of the second resistance, two electrical contacts arranged to define upper and lower limiting positions of the beam, each contact being electrically connected with a different one of the two electrical circuits, and a contact on the beam arranged to float normally between the first mentioned contacts and adapted to effect energization of either one or the other of the two electrical circuits upon contacting with either one or the other of the first mentioned contacts, depending upon the direction of unbalance of the beam, so as to reestablish the balance of the beam and of the quantities of fuel and air delivered to the furnace.

5. In a regulating mechanism for maintaining a balanced condition between the quantities of fuel and air delivered to a furnace and embodying a beam balanced about a fulcrum by the variable pressures of the fuel and the air, said beam exerting a controlling effect on the pressure of the air delivered to a furnace by relatively small movements of the beam on either side of its balanced position and between limiting positions, the combination of air delivery means for delivering air to a furnace, an electrically operated prime mover for actuating the air delivery means, a variable resistance connected to control the speed of operation of the prime mover, electro-magnetically controlled means adapted to effect increases and decreases in the value of said resistance in accordance with changes in the energization thereof, a second resistance, means to connect a variable portion of said second resistance to said electro-magnetically controlled means to control the degree of energization of the electro-magnetically controlled means, a third resistance in series with the variable portion of said second resistance, means to short-circuit said third resistance, electrically operated means for varying the value of said variable portion of the second resistance, an electrical circuit for controlling the last named means to cause it to effect an increase in the value of said variable portion of the second resistance, a second electrical circuit for controlling said last named means to cause it to effect a decrease in the value of said variable portion of the second resistance, two electrical contacts arranged to define upper and lower limiting positions of the beam, each contact being electrically connected with a different one of the two electrical circuits, and a contact on the beam arranged to float normally between the first mentioned contacts and adapted to effect energization of either one or the other of the two electrical circuits upon contacting with either one or the other of the first mentioned contacts, depending upon the direction of unbalance of the beam, so as to re-establish the balance of the beam and of the quantities of fuel and air delivered to the furnace.

6. In a regulating mechanism for maintaining a balanced condition between the quantities of fuel and air delivered to a furnace and embodying a beam balanced about a fulcrum by the variable pressures of the fuel and the air, said beam exerting a controlling effect on the pressure of the air delivered to a furnace by relatively small movements of the beam on either side of its balanced position and between limiting positions, the combination of air delivery means for delivering air to a furnace, an electrically operated prime mover for actuating the air delivery means, a variable resistance connected to control the speed of operation of the prime mover, electro-magnetically controlled means adapted to effect increases and decreases in the value of said resistance in accordance with changes in the energization thereof, a second resistance, means to connect a variable portion of said second resistance to said electro-magnetically controlled means to control the degree of energization of the electro-magnetically controlled means, electrically operated means for varying the value of said variable portion of the second resistance, an electrical circuit for controlling the last named means to cause it to effect an increase in the value of said variable portion of the second resistance, a second electrical circuit for controlling said last named means to cause it to effect a decrease in the value of said variable portion of the second resistance, two electrical contacts arranged to define upper and lower limiting positions of the beam, each contact being electrically connected with a different one of the two electrical circuits, a contact on the beam arranged to float normally betweeen the first mentioned contacts and adapted to effect energization of either one or the other of the two electrical circuits upon contacting with either one or the other of the first mentioned contacts, depending upon the direction of unbalance of the beam, so as to re-establish the balance of the beam and of the quantities of fuel and air delivered to the furnace, and means to effect cessation of the variation in the value of the variable portion of the second resistance at predetermined maximum and minimum values thereof, the last named means comprising means actuated by the electrically operated means, which varies the value of said variable portion of the second resistance, to effect opening of the aforesaid controlling electrical circuits when the predetermined maximum and minimum values are reached.

7. In a regulating mechanism for maintaining a balanced condition between the quantities of fuel and air delivered to a furnace and embodying a beam balanced about a fulcrum by the variable pressures of the fuel and the air, said beam exerting a controlling effect on the pressure of the air delivered to a furnace by relatively small movements of the beam on either side of its balanced position and between limiting positions, the combination of air delivery means for delivering air to a furnace, an electrically operated prime mover for actuating the air delivery means, a variable resistance connected to control the speed of operation of the prime mover, electro-magnetically controlled means adapted to effect increases and decreases in the value of said resistance in accordance with changes in the energization thereof, a second resistance, means to connect a variable portion of said second resistance to said electro-magnetically controlled means to control the degree of energization of the electro-magnetically controlled means, said last named means including a movable switch arm and contact, electrically operated rotary means connected to move said switch arm and contact over said second resistance to vary the variable portion thereof, said electrically operated rotary means having a relatively high rotative speed and being adapted to rotate in both directions, speed reducing means in the connection between the switch arm and the electrically operated rotary means, an electrical circuit for controlling the rotary means to cause it to effect an increase in the value of said variable portion of the second resistance, a second electrical circuit for controlling the rotary means to cause it to effect a decrease in the value of said variable portion of the second resistance, two electrical contacts arranged to define upper and lower limiting positions of the beam, each contact being electrically connected with a different one of the two electrical circuits, and a contact on the beam arranged to float normally between the first mentioned contacts and adapted to effect energization of either one or the other of the two electrical circuits upon contacting with either one or the other of the first mentioned contacts, depending upon the direction of unbalance of the beam, so as to reestablish the balance of the beam and of the quantities of fuel and air delivered to the furnace.

8. In a regulating mechanism for maintaining a balanced condition between the quantities of fuel and air delivered to a furnace and embodying a beam balanced about a fulcrum by the variable pressures of the fuel and the air, said beam exerting a controlling effect on the pressure of the air delivered to a furnace by relatively small movements of the beam on either side of its balanced position and between limiting positions, the combination of air delivery means for delivering air to a furnace, an electrically operated prime mover for actuating the air delivery means, a variable resistance connected to control the speed of operation of the prime mover, electro-magnetically controlled means adapted to effect increases and decreases in the value of said resistance in accordance with changes in the energization thereof, a second resistance, means to connect a variable portion of said second resistance to said electro-magnetically controlled means to control the degree of energization of the electro-magnetically controlled means, said last named means including a movable switch arm and contact, electrically operated rotary means connected to move said switch arm and contact over said second resistance to vary the variable portion thereof, said electrically operated rotary means having a relatively high rotative speed and being adapted to rotate in both directions, speed reducing means in the connection between the switch arm and the electrically operated rotary means, an electrical circuit for controlling the rotary means to cause it to effect an increase in the value of said variable portion of the second resistance, a second electrical circuit for controlling the rotary means to cause it to effect a decrease in the value of said variable portion of the second resistance, two electrical contacts arranged to define upper and lower limiting positions of the beam, each contact being electrically connected with a different one of the two electrical circuits, a contact on the beam arranged to float normally between the first mentioned contacts and adapted to effect energization of either one or the other of the two electrical circuits upon contacting with either one or the other of the first mentioned contacts, depending upon the direction of unbalance of the beam, so as to reestablish the balance of the beam and of the quantities of fuel and air delivered to the furnace, and means to effect cessation of the variation in the value of the variable portion of the second resistance at predetermined maximum and minimum values thereof, the last named means comprising a pair of normally closed contacts, one in each of the aforesaid controlling electrical circuits, and means actuated by the switch arm to effect opening of the contacts when the respective predetermined maximum and minimum values of the variable portion of the second resistance are reached by the switch arm.

9. In a regulating mechanism for maintaining a balanced condition between the quantities of fuel and air delivered to a furnace and embodying a beam balanced about a fulcrum by the variable pressures of the fuel and the air, said beam exerting a controlling effect on the pressure of the air delivered to a furnace by relatively small movements of the beam on either side of its balanced position and between limiting positions, the combination of air delivery means for delivering air to a furnace, an electrically operated prime mover for actuating the air delivery means, a variable resistance connected to control the speed of operation of the prime mover, electro-magnetically controlled means adapted to effect increases and decreases in the value of said resistance in accordance with changes in the energization thereof, a second resistance, means to connect a variable portion of said second resistance to said electro-magnetically controlled means to control the degree of energization of the electro-magnetically controlled means, electrically operated means for varying the value of said variable portion of the second resistance, an electrical circuit for controlling the last named means to cause it to effect an increase in the value of said variable portion of the second resistance, a second electrical circuit for controlling said last named means to cause it to effect a decrease in the value of said variable portion of the second resistance, a third electrical circuit controlling the first named electrical circuit and normally connected to one pole of a source of electrical energy, a fourth electrical circuit controlling the second named electrical circuit and normally connected to the same pole of the source of electrical energy, two electrical contacts arranged to define upper and lower limiting positions of the beam, each contact being connected with a different one of the third and fourth electrical circuits, a contact on the beam connected with the other pole of the source of electrical energy, arranged to float normally between the first mentioned contacts, and adapted to effect energization of either one or the other of the third and fourth electrical circuits upon contacting with either one or the other of the first mentioned contacts, an electro-magnet in each of the third and fourth electrical circuits, said electro-magnets serving to actuate the first and second electrical circuits upon actuation of the said electro-magnets in the third and fourth electrical circuits, and means to anticipate requisite increases and decreases in the value of the variable portion of the second resistance, the last named means comprising a fourth resistance in parallel with the variable portion of said second resistance and means to remove or restore the parallel connection thereof, said last named means comprising a fifth electrical circuit, a normally deenergized electro-magnet in the fifth electrical circuit, a sixth electrical circuit, a normally deenergized electro-magnet in the sixth electrical circuit, a circuit shunting the fourth resistance and having a normally open contact controlled by the electro-magnet in the fifth electrical circuit, a normally closed contact in the energizing circuit of the electro-magnet in the fifth electrical circuit controlled by the electro-magnet in the sixth electrical circuit, connections to energize the electro-magnet in the fifth electrical circuit upon energization of the electro-magnet in the third electrical circuit, and connections to energize the electro-magnet in the sixth electrical circuit upon energization of the electro-magnet in the fourth electrical circuit.

10. In combination with a furnace having separate pressure delivery means for fuel and for air, air delivery means for supplying air to the furnace, an electrically operated prime mover for actuating the air delivery means, an electrical circuit including a carbon pile resistance for controlling the speed of the electrically operated prime mover, means for controlling the value of said resistance comprising means to exert a variable pressure upon the resistance, means for controlling the resistance controlling means in such a manner as to speed up the operation of the electrically operated prime mover, means for controlling the resistance controlling means in such a manner as to slow down the operation of the electrically operated prime mover, and a balancing mechanism controlled jointly by the pressures of the fuel and the air for controlling the last two recited means, whereby to maintain a substantially constant ratio between the quantities of fuel and air delivered to the furnace.

11. In combination with a furnace having separate pressure delivery means for fuel and for air, air delivery means for supplying air to the furnace, an electrically operated prime mover for actuating the air delivery means, an electrical circuit including a carbon pile resistance for controlling the speed of the electrically operated prime mover, means for controlling the value of said resistance comprising means to exert a variable pressure upon the resistance, and a balancing mechanism controlled jointly by the pressures of the fuel and the air for controlling the means for exerting a variable pressure upon said resistance, whereby to maintain a substantially constant ratio between the quantities of fuel and air delivered to the furnace.

12. In combination with a furnace having separate pressure delivery means for fuel and for air, air delivery means for supplying air to the furnace, means to control the delivery of air by the air delivery means, an electrical circuit including a carbon pile resistance for variably controlling the air delivery control means, means for controlling the value of said resistance comprising means to exert a variable pressure upon the resistance, and a balancing mechanism controlled jointly by the pressures of the fuel and the air for controlling the means for exerting a variable pressure upon said resistance, whereby to maintain a substantially constant ratio between the quantities of fuel and air delivered to the furnace.

13. In combination with a furnace having separate pressure delivery means for fuel and for air, air delivery means for supplying air to the furnace, means to control the delivery of air by the air delivery means, an electrical circuit including a carbon pile resistance for variably controlling the air delivery control means by the pressure exerted on the resistance, and a balancing mechanism controlled jointly by the pressures of the fuel and the air for controlling the pressure exerted upon said resistance, whereby to maintain a substantially constant ratio between the quantities of fuel and air delivered to the furnace.

14. In combination with a furnace having separate pressure delivery means for fuel and for air, air delivery means for supplying air to the furnace, an electrically operated prime mover for actuating the air delivery means, an electrical circuit including a carbon pile resistance for controlling the speed of the electrically operated prime mover, a second electrical circuit including both a variable resistance and electro-magnetically operated means for controlling the value of the carbon pile resistance, means to control the amount of the variable resistance in the second electrical circuit, a balancing mechanism controlled jointly by the pressures of the fuel and the air for controlling the last named means, and means to effect predetermined maximum and minimum speeds of the electrically operated prime mover comprising means, operable upon the attainment of predetermined limiting amounts of the variable resistance inserted in the second electrical circuit, to interrupt operation of said variable resistance controlling means.

15. In combination with a furnace having separate pressure delivery means for fuel and for air, air delivery means for supplying air to the furnace, an electrically operated prime mover for actuating the air delivery means, an electrical circuit including a carbon pile resistance for controlling the speed of the electrically operated prime mover, a second electrical circuit including both a variable resistance and electro-magnetically operated means for controlling the value of the carbon pile resistance, means to control the amount of the variable resistance in the second electrical circuit, a balancing mechanism controlled jointly by the pressures of the fuel and the air for controlling the last named means, and means to anticipate requisite increases and decreases in the speed of the electrically operated prime mover comprising a second resistance in the second electrical circuit, and means actuated by the balancing mechanism to control alternate insertion of the second resistance in the second electrical circuit or short-circuiting thereof upon the initiation of desired changes in the speed of the electrically operated prime mover.

16. In combination with a furnace having separate pressure delivery means for fuel and for air, air delivery means for supplying air to the furnace, means to control the delivery of air by the air delivery means, a variable resistance electrically connected for variably controlling the air delivery control means, and a balancing mechanism controlled jointly by the pressures of the fuel and the air for controlling the value of said variable resistance, whereby to maintain a substantially constant ratio between the quantities of fuel and air delivered to the furnace.

17. In combination with a furnace having separate pressure delivery means for fuel and for air, air delivery means for supplying air to the furnace, means to control the delivery of air by the air delivery means, a variable resistance electrically connected for variably controlling the air delivery control means, electrically operated means for effecting increases and decreases in the value of said resistance for effecting changes in the quantity of air delivered by the air delivery control means, an electrical circuit for controlling the last named means to cause it to effect an increase in the value of said resistance, a second electrical circuit for controlling said last named means to cause it to effect a decrease in the valve of said resistance, and a balancing mechanism controlled jointly by the pressures of the fuel and the air for controlling said electrical circuits, whereby to maintain a substantially constant ratio between the quantities of fuel and air delivered to the furnace.

18. In combination with a furnace having separate pressure delivery means for fuel and for air, air delivery means for supplying air to the furnace, an electrically operated prime mover for actuating the air delivery means, a variable resistance connected to control the speed of operation of the prime mover, electrically operated means for effecting increases and decreases in the value of said resistance for effecting changes in the speed of operation of the prime mover, an electrical circuit for controlling the last named means to cause it to effect an increase in the value of said resistance, a second electrical circuit for controlling said last named means to cause it to effect a decrease in the value of said resistance, and a balancing mechanism controlled jointly by the pressures of the fuel and the air for controlling said electrical circuits, whereby to maintain a substantially constant ratio between the quantities of fuel and air delivered to the furnace.

19. In combination with a furnace having separate pressure delivery means for fuel and for air, air delivery means for supplying air to the furnace, means to control the delivery of air by the air delivery means, a variable resistance electrically connected for variably controlling the air delivery control means, electrically operated means for effecting increases and decreases in the value of said resistance for effecting changes in the quantity of air delivered by the air delivery control means, an electrical circuit for controlling the last named means to cause it to effect an increase in the value of said resistance, a second electrical circuit for controlling said last named means to cause it to effect a decrease in the value of said resistance, a balancing mechanism controlled jointly by the pressures of the fuel and the air for controlling said electrical circuits, and means to effect cessation of the variation in the value of the variable resistance at predetermined maximum and minimum values thereof, the last named means comprising means actuated by the electrically operated means, which varies the value of said variable resistance, to effect opening of the aforesaid controlling electrical circuits when the predetermined maximum and minimum values are reached.

20. In combination with a furnace having separate pressure delivery means for fuel and for air, air delivery means for supplying air to the furnace, means to control the delivery of air by the air delivery means, a variable resistance electrically connected for variably controlling the air delivery control means, electrically operated means for effecting increases and decreases in the value of said resistance for effecting changes in the quantity of air delivered by the air delivery control means, an electrical circuit for controlling the last named means to cause it to effect an increase in the value of said resistance, a second electrical circuit for controlling said last named means to cause it to effect a decrease in the value of said resistance, a balancing mechanism controlled jointly by the pressures of the fuel and the air for controlling said electrical circuits, and means to anticipate requisite increases and decreases in the value of the variable resistance, the last named means comprising a second resistance in parallel with the variable resistance and means controlled by the aforesaid electrical circuits to remove or restore the parallel connection thereof.

21. In a regulating mechanism for maintaining a balanced condition between the quantities of fuel and air delivered to a furnace and embodying a beam balanced about a fulcrum by the variable pressures of the fuel and the air, said beam exerting a controlling effect on the pressure of the air delivered to a furnace by relatively small movements of the beam on either side of its balanced position and between limiting positions, the combination of air delivery means for delivering air to a furnace, an electrically operated prime mover for actuating the air delivery means, a variable resistance connected to control the speed of operation of the prime mover, electrically operated means for effecting increases and decreases in the value of said resistance for effecting changes in the speed of operation of the prime mover, an electrical circuit for controlling the last named means to cause it to effect an increase in the value of said resistance, a second electrical circuit for controlling said last named means to cause it to effect a decrease in the value of said resistance, two electrical contacts arranged to define upper and lower limiting positions of the beam, each contact being electrically connected with a different one of the two electrical circuits, a contact on the beam arranged to float normally between the first mentioned contacts and adapted to effect energization of either one or the other of the two electrical circuits upon contacting with either one or the other of the first mentioned contacts, depending upon the direction of unbalance of the beam, so as to reestablish the balance of the beam and of the quantities of fuel and air delivered to the furnace, and means to effect cessation of the variation in the value of the variable resistance at predetermined maximum and minimum values thereof, the last named means comprising means actuated by the electrically operated means, which varies the value of said variable resistance, to effect opening of the aforesaid controlling electrical circuits when the predetermined maximum and minimum values are reached.

22. In a regulating mechanism for maintaining a balanced condition between the quantities of fuel and air delivered to a furnace and embodying a beam balanced about a fulcrum by the variable pressures of the fuel and the air, said beam exerting a controlling effect on the pressure of the air delivered to a furnace by relatively small movements of the beam on either side of its balanced position and between limiting positions, the combination of air delivery means for delivering air to a furnace, an electrically operated prime mover for actuating the air delivery means, a variable resistance connected to control the speed of operation of the prime mover, electrically operated means for effecting increases and decreases in the value of said resistance for effecting changes in the speed of operation of the prime mover, an electrical circuit for controlling the last named means to cause it to effect an increase in the value of said resistance, a second electrical circuit for controlling said last named means to cause it to effect a decrease in the value of said resistance, two electrical contacts arranged to define upper and lower limiting positions of the beam, each contact being electrically connected with a different one of the two electrical circuits, a contact on the beam arranged to float normally between the first mentioned contacts and adapted to effect energization of either one or the other of the two electrical circuits upon contacting with either one or the other of the first mentioned contacts, depending upon the direction of unbalance of the beam, so as to reestablish the balance of the beam and of the quantities of fuel and air delivered to the furnace, and means to anticipate requisite increases and decreases in the value of the variable resistance, the last named means comprising a second resistance in parallel with the variable resistance and means controlled by the aforesaid electrical circuits to remove or restore the parallel connection thereof.

23. In combination with a furnace having separate pressure delivery means for fuel and for air, air delivery means for supplying air to the furnace, electrically operated means to control the delivery of air by the air delivery means, a variable resistance electrically connected for variably controlling the electrically operated air delivery control means, and a balancing mechanism controlled jointly by the pressures of the fuel and the air for controlling the value of said variable resistance, whereby to maintain a substantially constant ratio between the quantities of fuel and air delivered to the furnace.

HARRY CAMPBELL GRANT, Jr.